United States Patent
Fu et al.

(10) Patent No.: US 9,369,079 B2
(45) Date of Patent: Jun. 14, 2016

(54) METHOD AND DEVICE FOR MONITORING A TORQUE OF AN ELECTRIC MOTOR

(75) Inventors: Chengxuan Fu, Kirchheim (DE); Wilfried Feuchter, Kupferzell (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 14/115,741

(22) PCT Filed: Mar. 5, 2012

(86) PCT No.: PCT/EP2012/053735
§ 371 (c)(1),
(2), (4) Date: Jan. 2, 2014

(87) PCT Pub. No.: WO2012/152463
PCT Pub. Date: Nov. 15, 2012

(65) Prior Publication Data
US 2014/0184125 A1     Jul. 3, 2014

(30) Foreign Application Priority Data

May 6, 2011   (DE) .......................... 10 2011 075 387

(51) Int. Cl.
*H02P 23/14*     (2006.01)
*H02P 29/02*     (2016.01)
(Continued)

(52) U.S. Cl.
CPC .............. *H02P 23/14* (2013.01); *B60L 3/0061* (2013.01); *B60L 3/12* (2013.01); *B60L 15/20* (2013.01); *H02P 21/148* (2013.01); *H02P 29/02* (2013.01); *B60L 2240/421* (2013.01);
(Continued)

(58) Field of Classification Search
CPC ....................................................... H02P 23/14
USPC ............................................ 318/490, 34, 558
See application file for complete search history.

(56) References Cited

U.S. PATENT DOCUMENTS 5,155,797 A * 10/1992 Nomura ................. G05B 13/04
318/799
5,661,386 A *  8/1997 Kueck .................. G01R 31/343
318/455

(Continued)

FOREIGN PATENT DOCUMENTS

DE    102005040783    3/2007
DE    102005049070    4/2007

(Continued)

OTHER PUBLICATIONS

International Search Report for Application No. PCT/EP2012/053735 dated Apr. 29, 2013 (English Translation, 3 pages).

*Primary Examiner* — David S Luo
(74) *Attorney, Agent, or Firm* — Michael Best & Friedrich LLP

(57) ABSTRACT

The invention relates to a method (40) for monitoring a torque of an electric motor (10), in particular for application in a motor vehicle, wherein the electric motor (10) is supplied with electric current (IS1, IS2, IS3) in multiple phases. A first torque value (M2) of the torque generated by the electric motor (10) is determined (58) on the basis of the electric output of the electric motor (10) and a detected rotational speed (n) of a rotor of the electric motor (10). A second torque value (M1) is determined on the basis of at least one measured phase current (IS1, IS2, IS3) and a rotational position of the rotor, and the two determined torque values (M1, M2) are compared (60) to one another for plausibility checking.

17 Claims, 3 Drawing Sheets

(51) Int. Cl.
    *H02P 21/14*     (2016.01)
    *B60L 3/00*     (2006.01)
    *B60L 15/20*     (2006.01)
    *B60L 3/12*     (2006.01)

(52) U.S. Cl.
    CPC ..... *B60L 2240/423* (2013.01); *B60L 2240/429* (2013.01); *Y02T 10/643* (2013.01); *Y02T 10/644* (2013.01); *Y02T 10/645* (2013.01); *Y02T 10/72* (2013.01); *Y02T 10/7275* (2013.01)

(56) References Cited

U.S. PATENT DOCUMENTS

| | | | | |
|---|---|---|---|---|
| 6,430,463 | B1 * | 8/2002 | Lysaght | ............ 700/168 |
| 7,199,548 | B2 * | 4/2007 | Inaguma | ............ H02P 21/0035 |
| | | | | 318/432 |
| 2005/0050965 | A1 * | 3/2005 | Zaremba | ............ B60K 6/48 |
| | | | | 73/862.08 |
| 2009/0066281 | A1 | 3/2009 | West et al. | |
| 2009/0133947 | A1 * | 5/2009 | Yoshihara | ............ B60K 6/48 |
| | | | | 180/65.285 |

FOREIGN PATENT DOCUMENTS

| | | |
|---|---|---|
| DE | 102008001714 | 11/2009 |
| WO | 2007090760 | 8/2007 |

* cited by examiner

METHOD AND DEVICE FOR MONITORING A TORQUE OF AN ELECTRIC MOTOR

BACKGROUND OF THE INVENTION

The present invention relates to a method for monitoring a torque of an electric motor, in particular for application in a motor vehicle, wherein the electric motor is supplied with electric current in multiple phases, wherein a first torque value of the torque which is output by the electric motor is determined on the basis of an electric power which is taken up by the electric motor and a detected rotational speed of the rotor of the electric motor.

According to a second aspect the present invention relates to a method for monitoring a torque of an electric motor, in particular for application in a motor vehicle, wherein the electric motor is supplied with electric current in multiple phases, wherein below a predefined rotational speed of a rotor of the electric motor a first torque value of the torque which is output by the electric motor is determined on the basis of an amplitude of at least one phase current.

The present invention also relates to a device for monitoring a torque of an electric motor with current-detecting means for detecting at least one phase current of the electric motor, rotor-detecting means for detecting a rotational position and/or a rotational speed of a rotor of the electric motor, and a control unit which is designed to carry out the method specified at the beginning Finally, the present invention relates to a motor vehicle drive train having at least one electric machine for making available drive power and a device of the type specified above.

In the field of electric motor technology, it is generally known to check the state of an electric motor and to determine an output variable, such as for example the torque which is output by the electric motor, and compare it with a setpoint state. By comparing the actual state with the setpoint state it is possible here to monitor the operation of the electric machine in order to react correspondingly in the event of deviation of the actual state from the setpoint state.

The torque which is output by the electric motor is usually calculated on the basis of an electric power which is extracted from a direct voltage source and a rotational speed of the rotor of the electric motor. In this context, the electric power which is extracted from the direct voltage source is calculated by means of the electrical voltage made available and an electric current which is detected by means of a direct current sensor.

DE 10 2008 001 714 A1 discloses a method in which the electric power which is taken up by the electric motor or a cross current which is the cause for the torque is detected and linked to a characteristic curve of a rotational speed of the electric motor in order to determine the present torque and compare it with a setpoint value.

A disadvantage with the methods known from the prior art is that due to the direct current sensor for determining the taken-up electric power the method is highly technically complex and measuring errors cannot be detected or taken into account during the determination of the torque which is output.

The object of the present invention is therefore to make available a method and a device for monitoring a torque of an electric machine which provides increased reliability with low technical complexity.

SUMMARY OF THE INVENTION

This object is achieved according to the invention with the method specified at the beginning by virtue of the fact that a second torque value is determined on the basis of at least one measured phase current and a rotational position of the rotor, and the two determined torque values are compared with one another for the purpose of plausibility checking This object is also achieved by means of the device which is specified at the beginning and which is designed to carry out the method according to the invention.

Finally, the above object is achieved by means of a motor vehicle drive train having an electric machine for making available drive power and a device of the type mentioned at the beginning for monitoring the torque of the electric machine.

By means of the present invention, it is possible to make available a method which provides a high level of reliability during the monitoring of the torque which is output, by virtue of two redundant calculation paths. This increased reliability is ensured by virtue of the fact that a simple fault, for example in a rotor position signal or a rotor speed signal, does not lead to a systematic torque fault since a second independent calculation path for the torque is made available and such a fault can be detected by virtue of the plausibility checking of the two independent paths. In particular, the method is particularly precise for different rotational speed ranges by virtue of the fact that the torque value is determined at low rotational speeds on the basis of a phase current amplitude.

It is particularly preferred if above a predefined rotational speed the taken-up power is determined on the basis of the measured phase currents and measured phase voltages.

As a result, the taken-up power can be measured and determined easily and precisely at the electric machine.

It is also preferred if the power loss of the electric motor is determined and is taken into account during the determination of the taken-up power.

As a result, the torque of the electric machine can be calculated even more precisely on one of the paths.

It is also preferred if a difference between the torque values is determined and a fault signal is generated and/or a fault reaction is initiated if the difference exceeds a predefined value.

This provides a simple possible way of plausibility checking which can be carried out with low technical complexity.

It is also preferred if a torque result is determined by forming mean values of the two torque values if the difference between the two torque values does not exceed a predefined value.

As a result, when there are small deviations between the determined values for the torque a result can be obtained which has only very small deviations from the torque which is actually made available.

It is preferred here if the torque result is compared with an actual torque of the electric machine, which actual torque is calculated on the basis of a model of the electric machine.

As a result, further plausibility checking can be carried out on the basis of a model which can take into account different parameters and measurement values of the electric machine, as a result of which increased reliability can be achieved by means of the additional plausibility checking It is also advantageous here if the model of the electric machine takes into account a temperature of the rotor.

As a result, the actual torque which is obtained can be determined even more precisely on the basis of the model since the temperature of the rotor influences the torque which is output.

It is particularly preferred here if the actual torque is compared with at least one predefined or determined limiting value for the torque of the electric machine.

In this way, predetermined critical states of the electric machine can be prevented, which increases the reliability in general.

It is also generally preferred if the electric current is detected in all the phase trains of the electric machine by means of one phase current sensor in each case.

As a result, the precision of the determination of the torque and as a result the reliability can be increased further since the independent phase current sensors form further redundance.

BRIEF DESCRIPTION OF THE DRAWINGS

Of course, the features, properties and advantages of the method according to the invention also apply or can be applied correspondingly to the device according to the invention.

DETAILED DESCRIPTION

Figure 1:
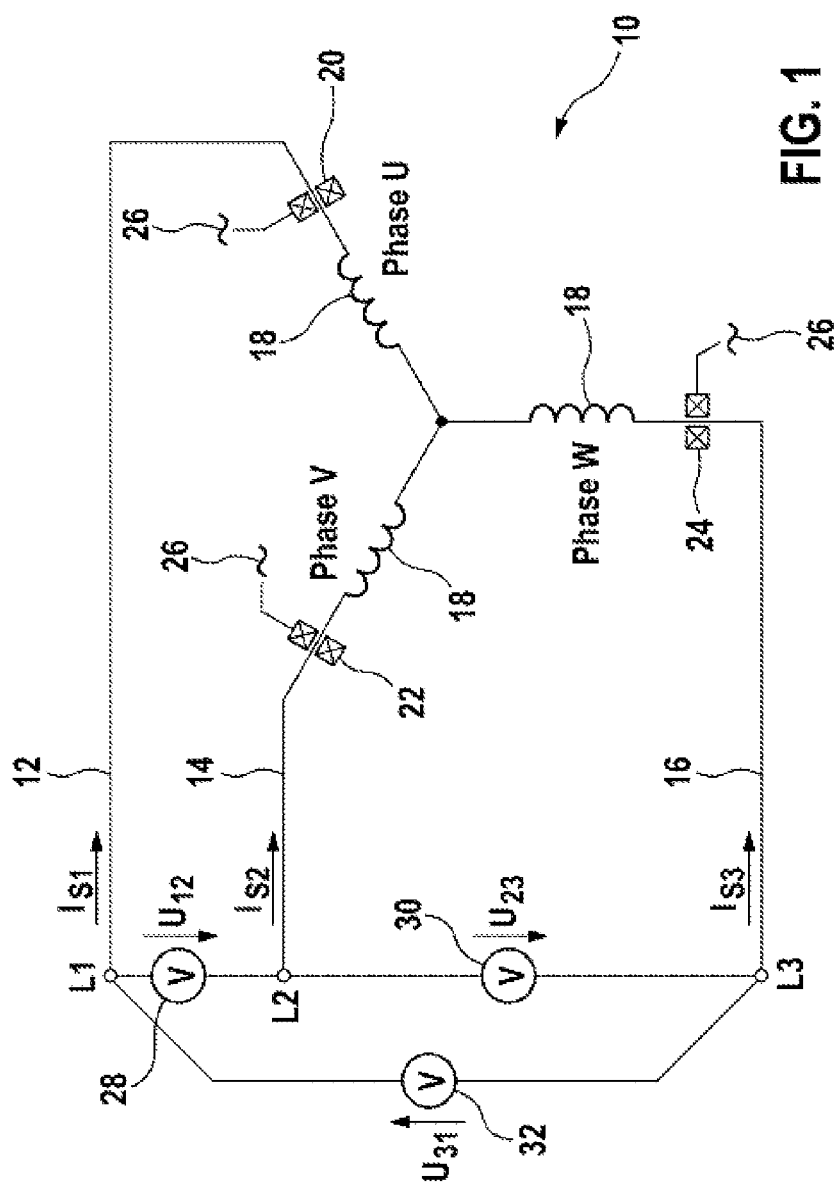
FIG. 1 shows the design of an electric machine in schematic form.

In FIG. 1, the design of an electric machine is shown in schematic form. The electric machine is denoted by 10 generally in FIG. 1.

The electric machine 10 has three phase current conductors 12, 14, 16 in which three phase currents IS1, IS2 and IS3 flow. The phase current conductors 12, 14, 16 are connected to respective exciter windings 18 of the electric machine 10. The exciter windings 18 are connected to one another in a star shape, wherein a zero conductor is preferably not provided.

The exciter windings 18 are denoted in FIG. 1 by phase V, phase U and phase W. The phase current conductors 12, 14, 16 are assigned sensors 20, 22, 24 which measure the phase currents IS1, IS2 and IS3 and each supply a corresponding current signal 26. The sensors 20, 22, 24 are embodied as ammeters. Alternatively, line voltages in the phase current conductors 12, 14, 16 for performing open-loop or closed-loop control can be measured by means of volt meters.

The sensors 20, 22, 24 are connected to a control unit (not illustrated), wherein the measured phase currents IS1, IS2 and IS3 are fed back to the control unit. The control unit supplies, on the basis of the current signals 26, a control signal to power electronics (not illustrated) in order to perform open-loop or closed-loop control of the electric machine 10. The phase currents IS1, IS2 and IS3 are preferably phase-shifted through 120° with respect to one another.

FIG. 1 also illustrates line voltages U12, U23 and U31 which drop between the phase current conductors 12, 14, 16. The line voltages U12, U23, U31 are detected by means of voltage sensors 28, 30, 32 which are arranged between the phase current conductors. The torque which is output by the electric machine 10 can be calculated on the basis of the phase currents IS1, IS2 and IS3 and the line voltages U12, U23 and U31 and a rotor position and/or a rotor speed of the rotor (not illustrated in FIG. 1) of the electric machine 10. In order to perform more precise closed-loop or open-loop control of the torque which is output it is necessary to know the phase currents IS1, IS2 and IS3, the phase voltages U12, U23, U31, the rotor position and the rotor speed. In this context, these variables can be detected by means of the sensors 20, 22, 24, 28, 30, 32 and the torque can be determined.

Figure 2:
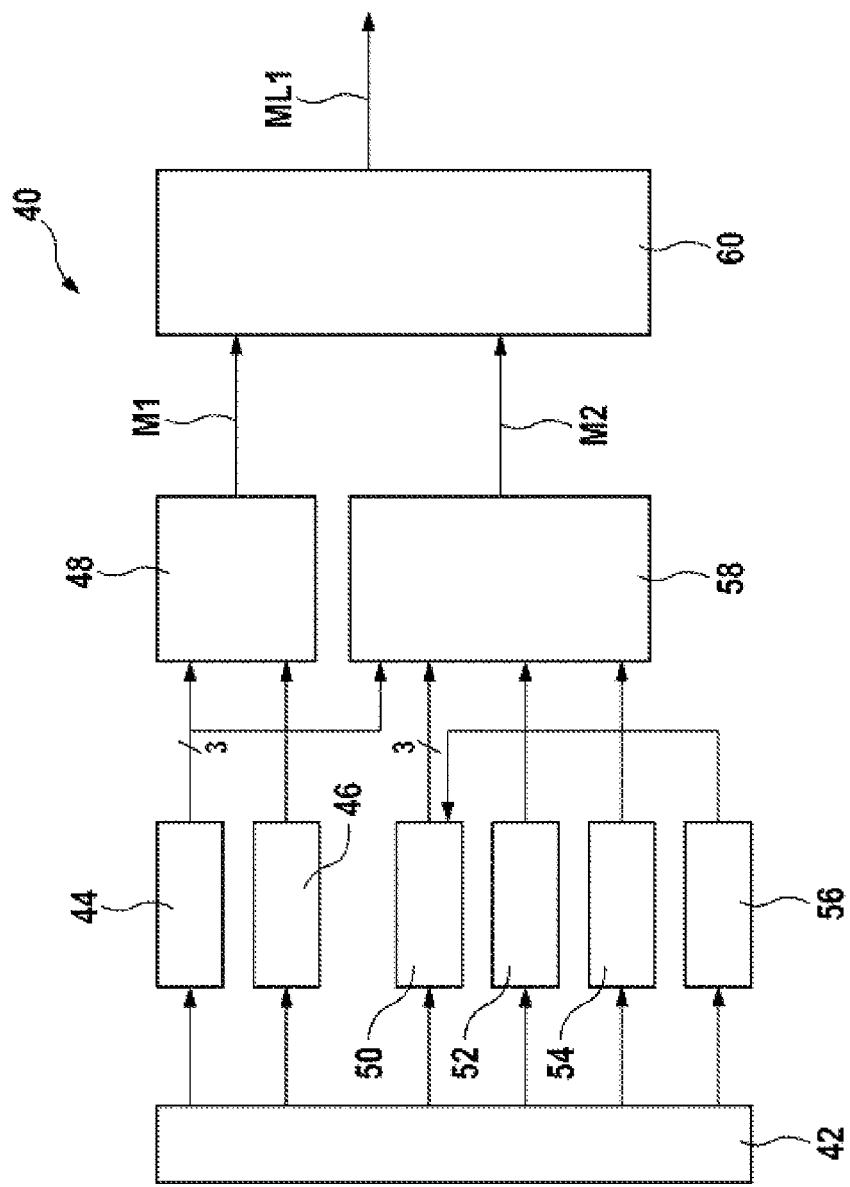
FIG. 2 shows, in schematic form, the sequence of the method according to the invention for determining a torque which is output.

FIG. 2 is a schematic illustration of the sequence for determining the torque which is output by the electric machine 10, and said sequence is denoted generally by 40.

The electric machine 10 and components assigned thereto are indicated schematically in FIG. 2 and denoted by 42. In order to determine the torque of the electric machine 10, the three phase currents IS1, IS2, IS3 are measured by means of the sensors 20, 22, 24, as is shown at 44. In addition, the position of the rotor of the electric machine 10 is detected by means of a rotor sensor, as shown at 46. The measured phase currents IS1, IS2, IS3 and the measured rotor position are used in a first calculation path to calculate the torque of the electric machine 10, as shown at 48. A torque M1 is determined by calculating the first path 48, and said torque M1 is made available for plausibility checking The torque value M1 is calculated here from the three phase currents IS1, IS2, IS3 and the rotor position according to the formula $$M1 = I\_AMP * A(phi)$$

where I_AMP is the amplitude of the phase current vector, and A(phi) is a factor which is dependent on the rotor position. In order to achieve a high level of integrated reliability, all three phases U, V, W are each detected with a separate phase current sensor 20, 22, 24. Furthermore, by checking the sum of all the phase currents it is possible to detect a simple fault at one of the three sensors. The torque value M1 which is calculated in this way is made available for further checking, as illustrated in FIG. 2.

In addition, the phase voltages U12, U23, U31 are detected by means of the voltage sensors 28, 30, 32, as is shown at 50. Furthermore, the rotor speed is detected, as is shown at 52. Finally, the actuation of the electric machine is detected by the power inverter, as is shown at 54, and the direct voltage of the voltage source is detected, as is shown at 56. The detected direct voltage is fed back to the step 50 for the determination of the phase voltages. In a second calculation path, a torque value M2 is then calculated on the basis of the phase voltages U12, U23, U31, the rotor speed and, in particular, the actuation by the power inverter, as is shown at 58.

The torque value M2 is calculated at 58 by means of the formula $$M2 = (U*1 - PV)/n$$

where U is the phase voltage, I is the phase current, PV is the power loss of the electric machine 10 and n is the rotational speed of the rotor. If the rotational speed n is sufficiently high, that is to say above a predefined value, the power which is output is calculated by the product of the phase currents IS1, IS2, IS3 and the phase voltages U12, U23, U31. If the rotational speed n is low, that is to say lower than a predetermined value, the calculation of the torque value M2 by means of the product of the phase currents IS1, IS2, IS3 and phase voltages U12, U23, U31 is imprecise. In that case, the torque value M2 is calculated with the formula $$M2 = I\_AMP * B$$

where I_AMP is the amplitude of the phase current vector and B is a factor which does not take into account the position of the rotor.

For very low rotational speeds n close to zero and equal to zero, the torque M2 cannot be calculated since the difference between the output voltage and the loss voltage is always equal to zero independently of the engine torque.

The torque values M1 and M2 are compared with one another at 60 or subjected to plausibility checking The plausibility checking is usually carried out by forming the difference between the torque values M1 and M2. If the difference exceeds a predefined value, a fault signal is generated and/or a fault reaction is initiated. This fault reaction may be, for example, that the output stages or the power inverter which actuates the electric machine 10 are switched to a safe state. If the difference is smaller than a predefined value, a mean value is calculated from the torque values M1 and M2 and the torque result ML1 which is obtained in this way is made available for further processing.

The calculation paths 48, 58 for calculating the values M1 and M2 are based on simple calculations and are therefore very robust and reliable. In this context, many influencing variables of the actual torque, such as for example the rotor temperature, are ignored.

However, as a result of the comparison of the two torque values M1 and M2 which are determined by means of different paths a high degree of reliability for the determination of the torque result ML1 is provided.

Figure 3:
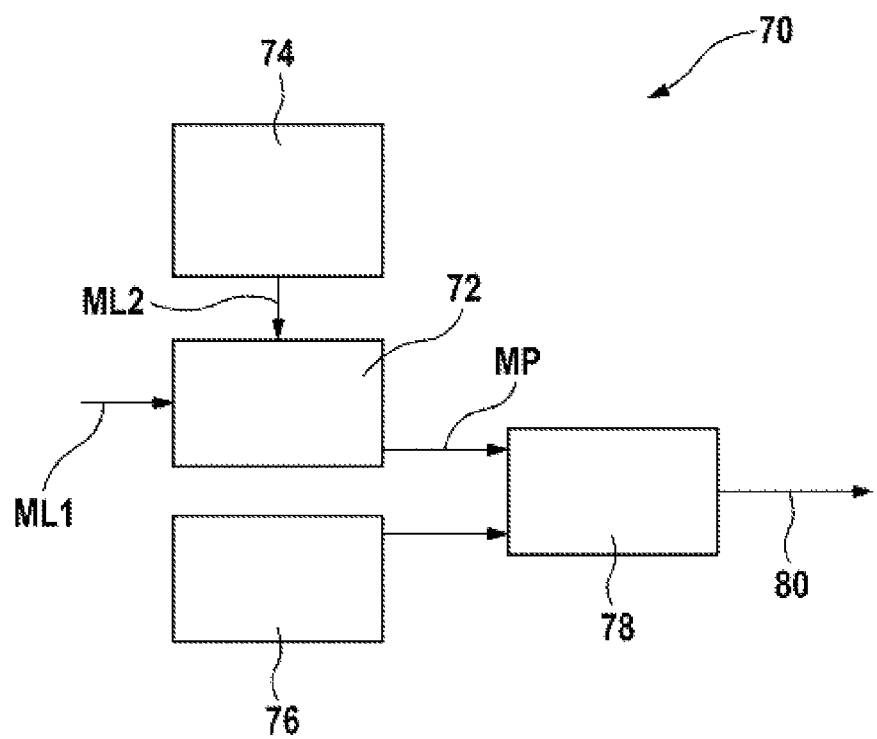
FIG. 3 shows, in schematic form, the sequence of a means for monitoring the torque of the electric motor.

FIG. 3 is a schematic illustration of a flow chart for monitoring the torque of the electric machine 10, said flow chart being generally denoted by 70. The averaged torque result ML1, which was determined at 60 in FIG. 2, is compared with an actual torque signal ML2 at 72 and/or subjected to plausibility checking The actual torque signal ML2 is calculated by means of a machine model, as is shown at 74. The machine model takes into account all the possible influencing variables of the actual torque, such as for example the rotor temperature. The actual torque signal ML2 which is acquired in this way supplies a very precise value of the torque which is actually output. The machine model provides a very high level of accuracy, but is not protected by complex security measures such as, for example, cyclical RAM/ROM tests, sequence monitoring, double storage of the variables etc. Provided that the plausibility checking 72 has a positive result, that is to say a deviation between the torque result ML1 and the actual torque signal ML2 is small, that is to say is lower than a predefined value, the actual torque signal ML2 is used for the further calculation, and is made available as an actual torque MP to a further check 78. In order to check the torque which is output, permissible torque limits are calculated at 76. These torque limits are preferably a permissible maximum and a permissible minimum of the torque which is output. These torque limits are made available to a torque comparator 78 which checks whether the actual torque MP is within the permissible limits which are determined at 76. If the actual torque MP is within the calculated limits or outside the calculated limits, a corresponding output signal 80 is made available by the torque comparator 78. If the torque MP is outside the calculated limits, for example the electric machine 10 can be stopped or else the power can be correspondingly reduced.

The invention claimed is:

1. A method (40) for monitoring a torque of an electric motor (10), wherein the electric motor (10) is supplied with electric current (IS1, IS2, IS3) in multiple phases, wherein a first torque value (M2) of the torque which is output by the electric motor (10) is determined (58) on the basis of electric power used by the electric motor (10) and a detected rotational speed (n) of a rotor of the electric motor (10), characterized in that a second torque value (M1) is determined on the basis of at least one measured phase current (IS1, IS2, IS3) and a rotational position of the rotor, and the two determined torque values (M1, M2) are compared (60) with one another for the purpose of plausibility checking, and wherein a torque result is determined (60) by forming mean values of the two determined torque values if a difference between the two torque values (M1, M2) does not exceed a predefined value.

2. The method as claimed in claim 1, wherein above a predefined rotational speed the power used is determined on the basis of the measured phase currents (IS1, IS2, IS3) and measured phase voltages (U12, U23, U31).

3. The method as claimed in claim 1, wherein a power loss of the electric motor (10) is determined and is taken into account during the determination of the power used.

4. The method as claimed in claim 1, wherein a difference between the torque values (M1, M2) is determined (60) and a fault signal is generated and/or a fault reaction is initiated if the difference exceeds a predefined value.

5. The method as claimed in claim 1, wherein the torque result (ML1) is compared (72) with an actual torque (ML2, MP) of the electric machine (10) which actual torque is calculated (74) on the basis of a model of the electric machine (10).

6. The method as claimed in claim 5, wherein the model of the electric machine (10) takes into account a temperature of the rotor.

7. The method as claimed in claim 5, wherein the actual torque (ML2, MP) is compared (78) with at least one predefined limiting value for the torque of the electric machine (10).

8. The method as claimed in claim 5, wherein the actual torque (ML2, MP) is compared (78) with at least one determined limiting value for the torque of the electric machine (10).

9. The method as claimed in claim 1, wherein the electric current (IS1, IS2, IS3) is detected in each of the phase trains (12, 14, 16) of the electric machine (10) by a phase current sensor (20, 22, 24).

10. A device for monitoring torque of an electric motor (10) comprising:
a current-detector (20, 22, 24) for detecting at least one phase current (IS1, IS2, IS3) of the electric motor (10),
a rotor-detector for detecting a rotational parameter of a rotor of the electric motor (10), and
a control unit which configured to carry out the method as claimed in claim 1.

11. A motor vehicle drive train having at least one electric machine (10) for making available drive power and having a device as claimed in claim 10.

12. The device as claimed in claim 10, wherein the rotational parameter is a rotational position and a rotational speed.

13. The device as claimed in claim 10, wherein the rotational parameter is a rotational position.

14. The device as claimed in claim 10, wherein the rotational parameter is a rotational speed.

15. The method as claimed in claim 1, wherein the method is applied in a motor vehicle.

16. A method (40) for monitoring a torque of an electric motor (10), wherein the electric motor (10) is supplied with electric current (IS1, IS2, IS3) in multiple phases, wherein below a predefined rotational speed of a rotor of the electric motor a first torque value (M2) of the torque which is output by the electric motor (10) is determined (58) on the basis of an amplitude of at least one phase current (IS1, IS2, IS3), characterized in that a second torque value (M1) is determined on the basis of at least one measured phase current (IS1, IS2, IS3) and a rotational position of the rotor, and the two determined torque values (M1, M2) are compared (60) with one another for the purpose of plausibility checking, and wherein a torque result is determined (60) by forming mean values of the two determined torque values if a difference between the two torque values (M1, M2) does not exceed a predefined value.

17. The method as claimed in claim 16, wherein the method is applied in a motor vehicle.

* * * * *